March 29, 1927.  1,622,449
F. J. KATZ
DIFFERENTIAL LOCK FOR MOTOR VEHICLES
Filed Oct. 5, 1921  3 Sheets-Sheet 1
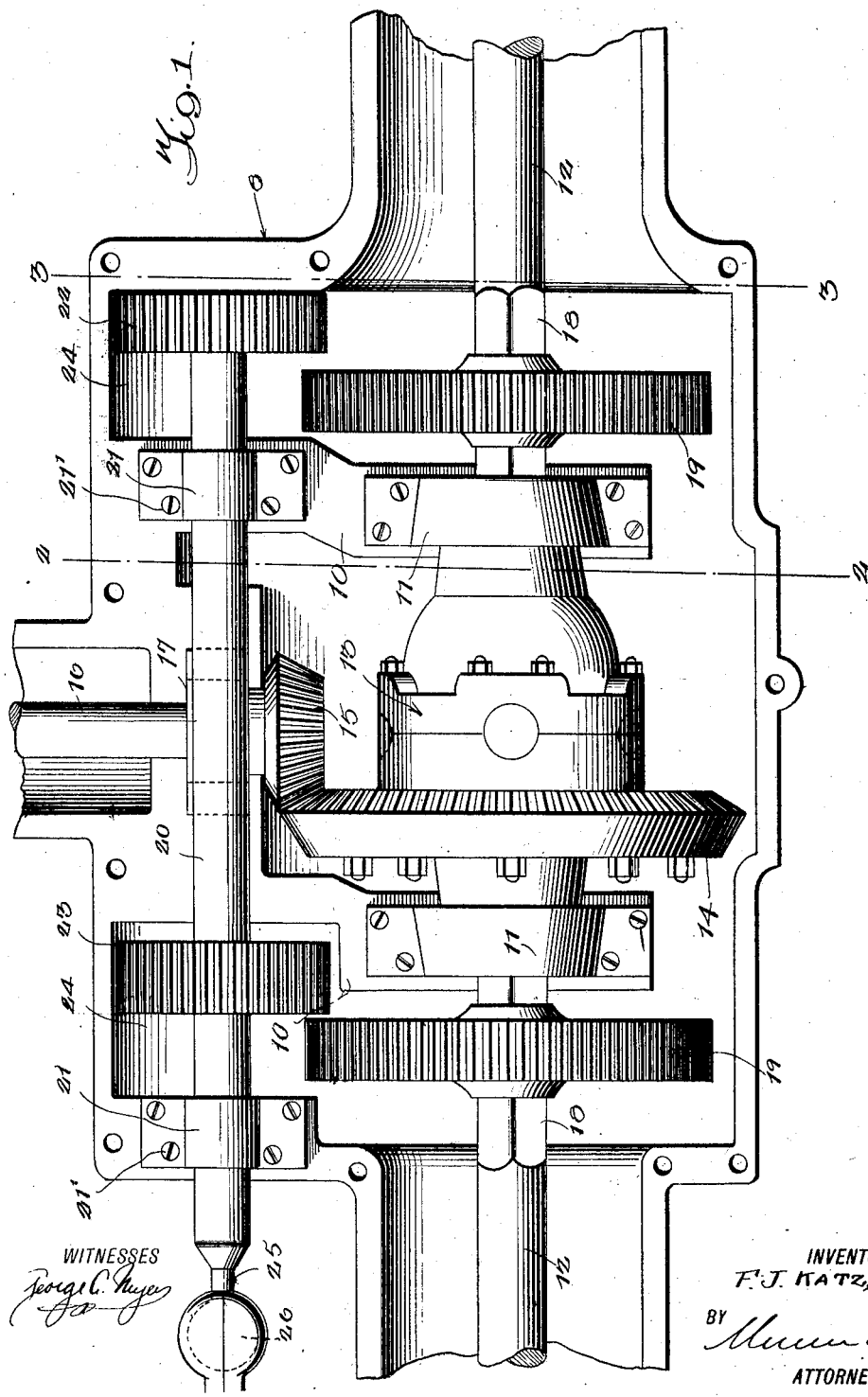
WITNESSES
INVENTOR
F. J. KATZ,
BY
ATTORNEYS

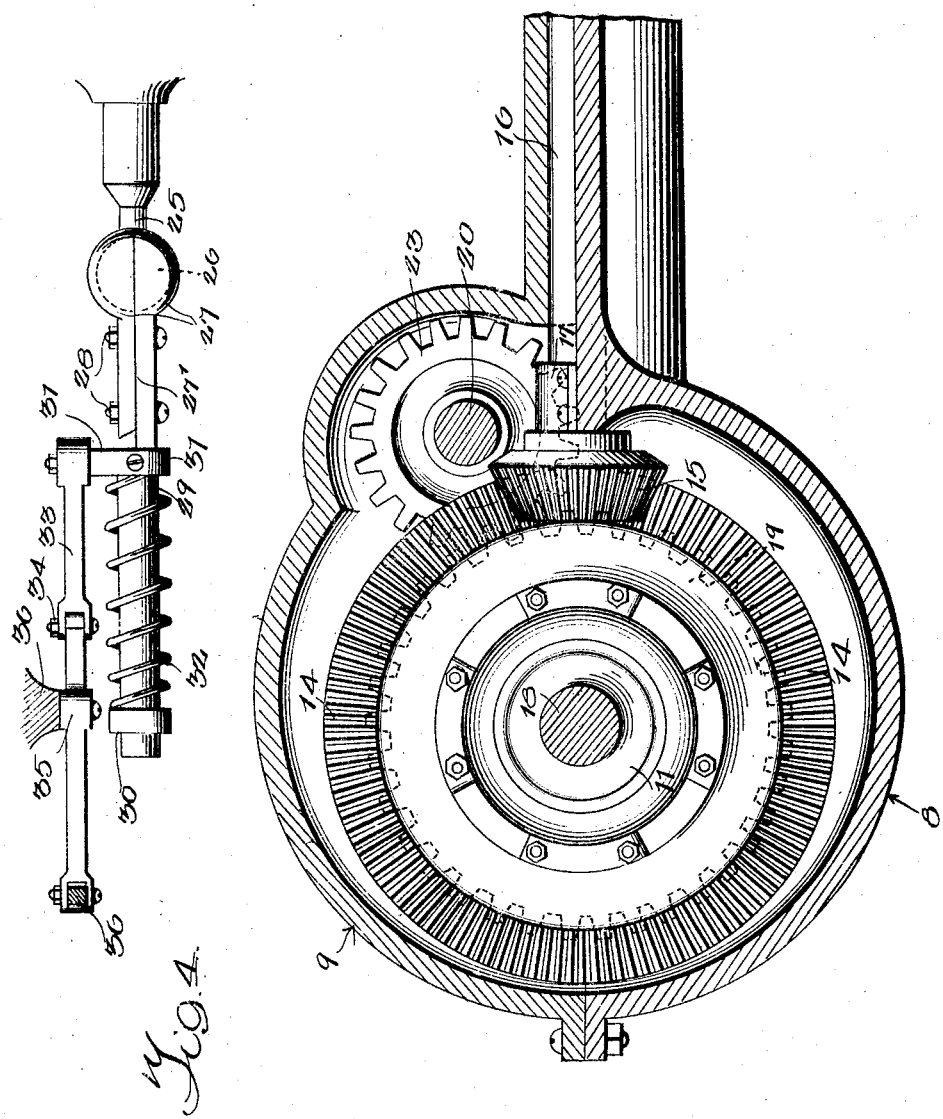

March 29, 1927. 1,622,449
F. J. KATZ
DIFFERENTIAL LOCK FOR MOTOR VEHICLES
Filed Oct. 5, 1921 3 Sheets-Sheet 3
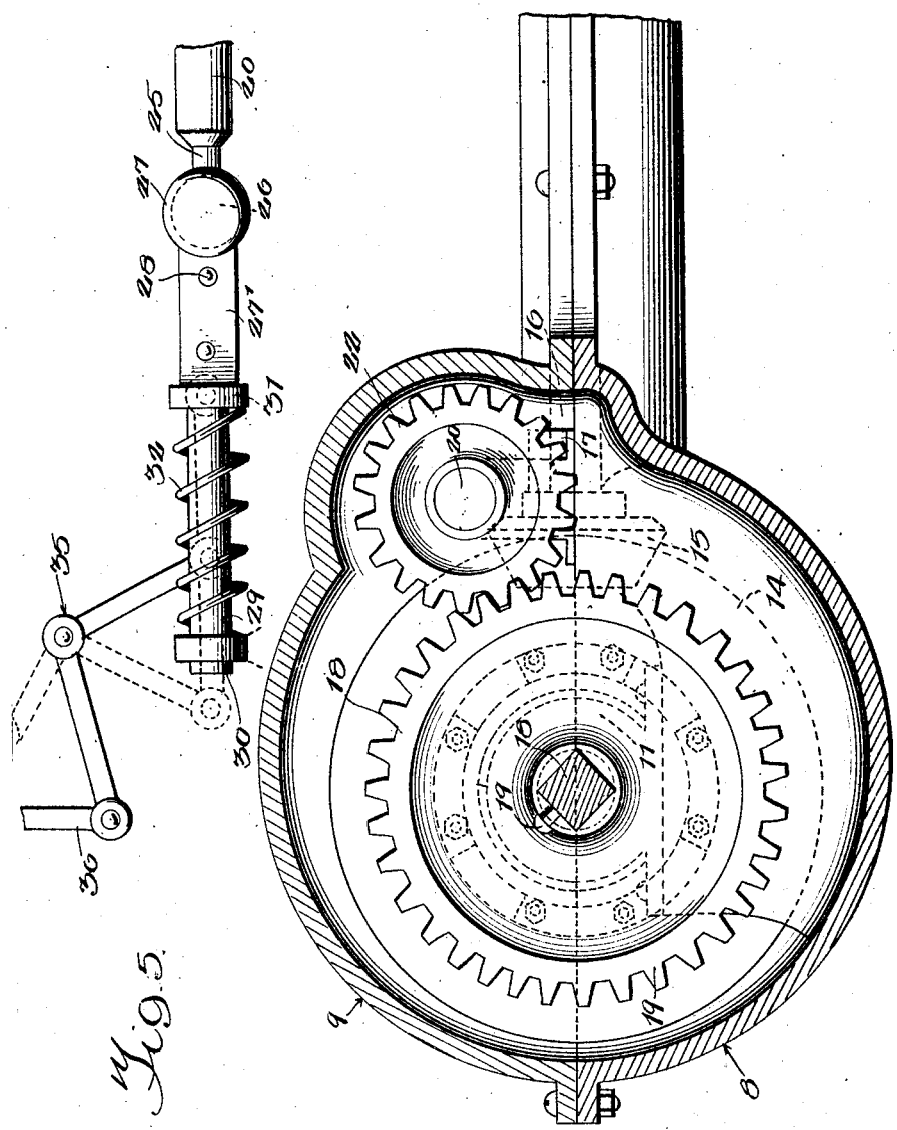
WITNESSES
INVENTOR
F. J. KATZ,
BY
ATTORNEYS Patented Mar. 29, 1927.

1,622,449

UNITED STATES PATENT OFFICE.

FREDERICK J. KATZ, OF SHREVEPORT, LOUISIANA.

DIFFERENTIAL LOCK FOR MOTOR VEHICLES.

Application filed October 5, 1921. Serial No. 505,516.

This invention relates to a differential lock for motor vehicles.

The object of the invention is to provide a differential lock adapted to lock together the spindles driven through a differential so that the same will rotate in unison and represent one continuous and rigid spindle.

It is also an object of the invention that the differential lock be extremely simple in construction and positive in operation.

It is a further object that the differential lock be adapted to be operated from a remote point or from the drivers seat of a motor vehicle with which the same may be associated.

A still further object of the invention is that locking means be adapted to automatically disengage itself with the differential to permit the differential to return to its novel functioning at the time when the locking means may be released by the driver of the motor vehicle.

Other objects and objects relating to details of construction, combination and arrangement of parts will hereinafter appear in the detailed description to follow:

Figure 1 is a top plan view of a differential having the top casing section removed and showing the invention applied, Figures 2 and 3 are vertical sectional views taken on the line 2—2 and 3—3 respectively of Figure 1, Figure 4 is a detail plan view of the mechanism for operating the differential lock, Figure 5 is a side elevation of the same and showing in dotted lines the operative portion of the bell crank lever associated therewith.

Referring to the drawings more particularly, 8 indicates generally the bottom section of a differential housing or casing, and 9 the top section thereof. The bottom section has formed in the interior thereof the usual supporting walls or ribs 10, each of which carries a bearing 11 which journals the one end of a spindle 12. Between the inner ends of the spindles 12 there is interposed the usual differential unit generally indicated by the reference numeral 13, said differential unit being of the standard construction and operated in a manner well understood. The differential unit 13 carries the usual drive gear 14 which is in constant mesh with the drive pinion 15 carried by the shaft 16, said shaft 16 being supported at its rear end by the ball bearing generally indicated at 17.

The structure heretofore described is well known and only brief reference has been made thereto. In obtaining the objects of the present invention, I mount upon the inner and square portion 18 of each spindle 12 a gear wheel 19, said gear wheels being thus adapted to rotate with the spindles 12 and each gear wheel is held against longitudinal movement upon its associated spindle by a set screw 19′, Figure 3.

Forward to the gears 19 there is positioned a shaft 20, said shaft being journaled for rotative movement and also for longitudinal sliding movement by the bearings 21, the bearings 21 being preferably of the design shown and secured to the casing section 10 by the means of screws as at 21″. Upon the one end of the shaft 20 there is secured a gear 22 which is adapted to be brought into mesh with the associated gear wheel 19 and adjacent the other end of the shaft there is secured a similar gear 23 which is likewise adapted to be brought into mesh with the associated gear wheel 19. Each gear 22 and 23 is adapted to operate in the associated recess 24 of the casing section 10 and it will be noted that the face of the gear 23 is of greater width than that of the gear 22, the purpose of which will later be explained.

The end of the shaft 20 opposite to that upon which the gear 22 is formed with a reduced portion 25 which terminates in a bore 26. The bore 26 is enclosed by a pair of complemental socket members 27, said socket members having extended shanks and said shanks being secured together by the bolts 27′. One of the shanks 27′ terminates in an enlarged cylindrical portion 29 which is held for longitudinal sliding movement at its free end by a collar bracket 30. To the forward end of the enlarged cylindrical portion 29 there is secured a second collar 31, and between the collar 30 and 31 there is interposed a coil spring 32, said coil spring surrounding the enlarged portion as shown. The collar 31 is formed with a suitable extension as at 31′ which is reduced and adapted for journaling the one end of a ring 33, the other end of the ring being pivotally connected as at 34 to the one arm of a bell crank lever 35. The bell crank 35 is suitably fulcrumed to a stationary support as at 36 and the free end of its other arm is pivoted to an operating lever as indicated at 26, said operating lever being extended so that the same may be manipulated by the driver of the motor vehicle with which the present invention may be associated.

In the operation of the present apparatus when it is desired to lock together the spindles 12 so that the same may rotate in unison and as one spindle, the bell crank lever 35 is operated by the driver of the motor vehicle for shifting longitudinally the shaft 20 in a direction for bringing the gears 22 and 23 into mesh with the gears 19. Upon the gears 22 and 23 meshing with the gears 19 the spindles 12 become rigidly locked together through the shaft 20 for rotation in unison and at the same speed. Upon the driver releasing the bell crank lever 35 the spring 32 will urge the shaft 20 in the opposite direction or in the direction for disengaging the gears 22 and 23 from the gears 19, and thus automatically releasing the spindles 12 from each other.

It is to be pointed out that the axial center of gear 23 is spaced from its associated gear 19, the same distance the axial center of gear 22 is spaced from its associated gear 19, but due to the fact the gear 23 has a face of greater width than the gear 22 said gear 23 will engage with its associated gear 19 previous to the moment gear 22 engages with its associated gear 19.

While I have shown and described the preferred form of my invention, I wish it to be understood that I am aware of the fact that the construction, combination and arrangement of parts may be changed by those skilled in the art, without departing from the spirit of the invention as indicated by the appended claims.

I claim:

1. In combination with a differential through which a pair of aligned spindles are driven, a gear carried by each spindle, a longitudinally shiftable shaft, a plurality of pinions carried by said shaft, one for each spindle gear, said pinions being normally out of mesh with said spindle gears and arranged whereby with shifting of the shaft carrying the same in one direction the pinions will engage their respective pinions at different intervals.

2. In combination with a differential through which a pair of aligned spindles are driven, a gear carried by each spindle, a longitudinally shiftable shaft, a plurality of pinions carried by said shaft, one for each spindle gear, said pinions being arranged equi-distant from their respective spindle gears and one pinion having a broader gear face than the other whereby with shifting movement of the shaft carrying said pinions in one direction the pinions will engage their respective gears at different intervals.

FREDERICK J. KATZ.